United States Patent [19]

King et al.

[11] Patent Number: 4,825,374

[45] Date of Patent: Apr. 25, 1989

[54] AIRCRAFT DESCENT GUIDE SYSTEM AND METHOD FOR CREATING DESCENT GUIDANCE INFORMATION

[75] Inventors: Ethmer W. King; Robert C. Kircher, Jr.; David S. Yotsuuye, all of King County, Wash.

[73] Assignee: The Boeing Company, Seattle, Wash.

[21] Appl. No.: 811,283

[22] Filed: Dec. 20, 1985

[51] Int. Cl.⁴ ............................................. G06F 15/50
[52] U.S. Cl. .................... 364/433; 364/428; 73/178 T; 244/186
[58] Field of Search ................. 364/428–430, 364/432–434, 442, 444; 73/178 T; 244/183, 185, 186; 340/947, 951, 952, 967, 972, 976

[56] References Cited

U.S. PATENT DOCUMENTS

| | | | |
|---|---|---|---|
| 3,705,306 | 12/1972 | Lydon et al. | 364/433 |
| 3,752,967 | 8/1973 | Vietor | 364/433 |
| 3,868,497 | 2/1975 | Vietor | 364/430 |
| 4,086,632 | 4/1978 | Lions | 364/444 |
| 4,368,517 | 1/1983 | Lovering | 364/428 |
| 4,387,360 | 6/1983 | Jourdan et al. | 364/433 |
| 4,633,404 | 12/1986 | Greeson et al. | 364/428 |
| 4,638,437 | 1/1987 | Cleary et al. | 364/428 |

*Primary Examiner*—Gary Chin
*Attorney, Agent, or Firm*—Hughes, Cassidy & Multer

[57] ABSTRACT

An aircraft navigational system includes a digital computer, a first visual output for displaying to an aircrew a geometrical representation of an optimum descent guideslope relative to a symbol representing the location of the aircraft, and a second visual output for displaying optimum descent guideslope information, such as altitude and distance, alphanumerically. The visual display provides guidance information to the aircrew to control the descent of the aircraft along an optimum descent guideslope which is referenced to a selected end of descent waypoint such as a destination airport or to an instrument approach marker. The guideslope is calculated in accordance with predetermined airspeed and altitude requirements with define a descent profile which is fuel efficient and which complies with aviation regulations regarding maximum airspeed limitations. The navigational system includes a keypad interfaced with the computer to allow the aircrew to enter data inflight to generate the visual and alphanumerical display of the optimum descent guideslope.

23 Claims, 11 Drawing Sheets

FIG. 8

```
         1     5       10      15      20   24
    1         ENERGY  MGMT    DES     2/2
              E/M FIX DTG             SPD/ALT
    3    NOLLA           125          170/2200
              TO IDLE  DES            REF ALT
    5                      25             15200
              TO DRAG  REQ
    7
              REQ SPD
    9         270
```

Buttons left: 1L, 2L, 3L, 4L, 5L, 6L
Buttons right: 1R, 2R, 3R, 4R, 5R, 6R

70

AIRCRAFT DESCENT GUIDE SYSTEM AND METHOD FOR CREATING DESCENT GUIDANCE INFORMATION

TECHNICAL FIELD

The present invention relates to an aircraft navigational system for providing information to guide the descent of an aircraft, as well as methods for creating descent guidance information; and more particularly to a navigational system which in response to preselected aircraft operating parameters, such as airspeed and altitude, provides guidance information to allow the aircraft to descend along an optimum descent guideslope.

BACKGROUND OF THE INVENTION

As the number of aircraft continues to increase, greater constraints are being placed upon operation of these aircraft particularly in and around destination points such as airports and instrument landing system marker beacons. These constraints are usually in the form of altitude, heading and airspeed limitations to which the aircraft must closely adhere in order to achieve the required spacing from other aircraft in the area. Around those destinations having a greater density of aircraft, the number of altitude and airspeed constraints may increase. For example, a descending aircraft may have several intermediate altitudes and airspeeds as well as several heading changes during the descent in order to maintain proper spacing from other aircraft.

Coupled with the traffic separation requirements, the high cost of fuel has necessitated that the aircraft be operated as fuel efficiently as possible throughout the flight. In some of the more sophisticated aircraft, such as those flown by commercial airlines, the flight is planned from takeoff to landing to achieve maximum fuel efficiency. Numerous factors such as aircraft gross weight, prevailing winds, assigned cruising altitudes, and distance to destination are computed to arrive at aircraft operating parameters such as takeoff, climb, cruise and descent airspeeds and altitudes which will achieve optimum fuel use while maintaining aircraft safety. In the more sophisticated aircraft, these altitudes and airspeeds are calculated and then stored prior to takeoff in sophisticated aircraft navigational systems which typically include a programmable digital flight computer. The computer provides the pilot with the necessary information to fly the aircraft along the programmed route. When the aircraft is flying on autopilot, this information is relayed to the autopilot system which generates commands to the flight controls to fly the aircraft along the programmed route.

Sometimes however, the aircraft is not permitted to fly the exact route as programmed. Changes to the programmed route of flight may be required during the descent phase of the flight when traffic spacing becomes more precise due to the density of aircraft. Therefore, unplanned heading, altitude and airspeed changes may be required. When these changes require a departure from the programmed flight route, they may be made without the benefit of information concerning optimum descent rates and airspeeds, thereby resulting in increased fuel consumption.

Conventionally, glideslope information has been provided to aircraft in the form of radio signals transmitted from a ground station to the aircraft. These are deciphered by equipment onboard the aircraft to generate a visual display of the aircraft's position relative to the electrically beamed glideslope. Typical aircraft glideslope navigational devices have been disclosed in U.S. Pat. No. 4,012,626 by Miller, et al, which disclosed an air navigation system which generates a pitch command signal for controlling the vertical flight of an aircraft, and which is produced by summing a signal indicative of the vertical displacement of the aircraft from a computed glideslope. The glideslope is computed using data representing the aircraft range from a VORTAC station, aircraft altitude, desired altitude, flight path angle, bias offset and waypoint location.

In U.S. Pat. No. 4,021,009—Baker, et al, there is disclosed an area navigation system having vertical path control wherein a minimum flight path angle is computed using the aircraft altitude, the altitude of a navigational waypoint, and the distance of the aircraft from the navigational waypoint. The aircraft instantaneous flight path angle is compared to the computed minimum flight angle to generate an error signal which is displayed in the aircraft.

Various other aircraft navigational systems have been disclosed which provide information for navigating an aircraft. Foster, U.S. Pat. No. 4,413,322 discloses an area navigation device which automatically establishes guidepoints along a preselected course line intersecting any one of four cardinal radials of a VOR station.

In U.S. Pat. No. 4,220,994—Hendrickson, there is disclosed a microprocessor based system which uses geometrical relationships to assist in aircraft navigation.

In U.S. Pat. No. 2,671,621—Schuck, there is disclosed a navigation system which provides a number of nonconverging electronic guide paths.

Apparatus and methods for continuous computation of a course line from an aircraft to a destination point are disclosed in U.S. Pat. No. 3,581,073 by Visher.

Kreeger, U.S. Pat. No. 3,899,662 discloses a CRT for displaying to the pilot the position and motion of the aircraft relative to ground references and terrain features.

U.S. Pat. No. 3,919,529 by Baker, et al, discloses a radio navigation system utilizing navigational data for the generation of aircraft positional information with respect to a radar guidance transmitter system.

Apparatus for combining positional data from VOR/DME radio navigation systems with data derived from an OMEGA receiver is disclosed in U.S. Pat. No. 3,941,983.

In U.S. Pat. No. 3,994,456—Post, et al, there is disclosed control apparatus for an aircraft navigation system which computes a curved path between two courses.

Narveson, U.S. Pat. No. 4,070,662 discloses a display generator for generating video signals at a CRT screen.

U.S. Pat. No. 4,086,632—Lions, discloses a slew control to generate guidepoints on a computer based CRT map display unit.

The following U.S. patents disclose various aircraft navigational systems comprising principally electronic hardware adapted to create guidepoints for aircraft navigation: U.S. Pat. No. 4,283,705; U.S. Pat. No. 4,212,067; U.S. Pat. No. 4,069,412; U.S. Pat. No. 3,838,427; U.S. Pat. No. 3,831,010; U.S. Pat. No. 3,803,611; U.S. Pat. No. 3,778,601; U.S. Pat. No. 3,796,867; U.S. Pat. No. 3,750,942; U.S. Pat. No. 3,696,671; U.S. Pat. No. 3,659,291; U.S. Pat. No. 3,644,928; U.S. Pat. No. 3,696,426; U.S. Pat. No.

3,652,837; U.S. Pat. No. 3,621,211; U.S. Pat. No. 3,500,413; U.S. Pat. No. 3,486,815; U.S. Pat. No. 3,534,399; U.S. Pat. No. 3,234,552; and U.S. Pat. No. 3,140,391.

SUMMARY OF THE INVENTION

The present invention includes a number of conventional components such as a programmable digital flight management computer for programming flight navigational information such as waypoint data which define geographical locations along an active flight plan route. A keypad is interfaced with the computer to allow the aircrew to manually input navigational data into the computer, and a CRT screen is provided for displaying data alphanumerically to the aircrew. In addition, a horizontal situation indicator is interfaced with the computer and includes a CRT screen for displaying in a geometric format such navigational information as the proposed route of flight, waypoints, and the location of the aircraft relative to the aforementioned waypoints and proposed route of flight. In accordance with the present invention, a geometric presentation of the location of the aircraft relative to a predetermined descent guideslope is displayed at the horizontal situation indicator. The descent guideslope is calculated utilizing flight parameters such as aircraft airspeed and altitude, and provides a guideslope which the pilot observes to guide the aircraft descent in a fuel efficient manner.

In addition, an alphanumerical display is provided of recommended altitudes defining the descent guideslope as a function of the distance from the aircraft to an end of descent waypoint which is located at the bottom of the guideslope. Therefore, by comparing the present altitude of the aircraft with the displayed guideslope altitude, the pilot can adjust the aircraft's rate of descent to correspond to the calculated guideslope.

Two descent guideslopes are displayed geometrically, including a first descent guideslope representing a calculated descent in a clean aircraft configuration with the engines at idle, and a second descent guideslope representing an idle descent with the aircraft speed brakes extended.

The clean, idle descent guideslope is defined relative to the end of descent waypoint by a plurality of upper descent points each of which has an altitude component and a horizontal distance component. The end of descent waypoint represents a predetermined altitude above a predetermined location referenced to earth, e.g. longitude/latitude. The location of the upper descent points are calculated so that, (i) a fuel efficient descent is achieved and (ii) the descent conforms to certain aviation regulations such as requirements of a maximum indicated airspeed of 250 KIAS below 10,000 feet altitude.

The geographical location of the aircraft is continuously fed to the computer from the aircraft's inertial navigation system. The geographical location of the end of descent waypoint is stored in the computer, and the distance between the end of descent waypoint and the aircraft is continuously calculated. The location of the upper descent points defining the calculated guideslope are determined relative to the end of descent waypoint and displayed visually in order to provide the aircrew with information regarding the position of the aircraft relative to the calculated descent guideslope.

It is therefore a general object of the present invention to provide an aircraft navigational system for providing information to guide an aircraft along a descent path, and methods for creating descent guidance information.

BRIEF DESCRIPTION OF THE DRAWINGS

These and other objects and advantages of the present invention will become more readily apparent upon reading the following detailed description and upon reference to the attached drawings in which:

FIG. 8 is an illustration of the Energy Management page where optimum clean idle descent guideslope information as well as speed brakes extended descent guideslope information is displayed alphanumerically;

Figure 1:
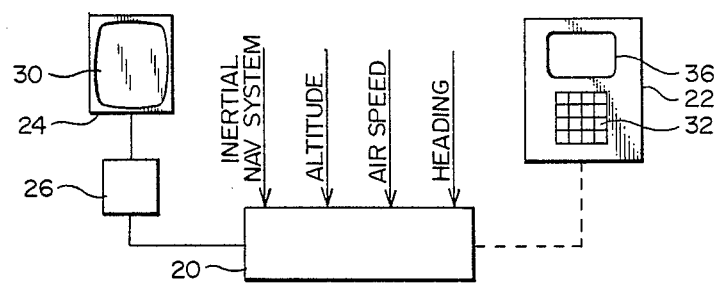
FIG. 1 is a simplified diagram of the aircraft navigational system of the present invention including a digital flight management computer (FMC), a control data unit (CDU) having an input keypad and an alphanumerical display screen, and a horizontal situation indicator (HSI) having a symbol generator, and a CRT display.

While the present invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention.

DETAILED DESCRIPTION OF THE INVENTION

I. INTRODUCTION

The present invention comprises an aircraft navigational system which generates descent information to guide the aircraft along a computed descent guideslope. As discussed previously, prior to takeoff some sophisticated aircraft have computer systems containing flight plan information including various courses, navigational checkpoints, altitudes, and airspeeds to guide the aircraft during takeoff, climb, cruise, and then descent and landing. These courses, altitudes and airspeeds are often predicated upon maintaining maximum fuel efficiency throughout the flight. Frequently, however, the aircrew will receive instructions from an air traffic controller to vary the aircraft's programmed route of flight, particularly during the descent phase where both vertical and horizontal spacing between aircraft becomes more precise due to the presence of large numbers of aircraft around the destination airfield. Once the aircraft is diverted from its programmed altitude, airspeed or heading, the programmed flight data is of less value to the pilot in operating the aircraft in a fuel efficient manner since the programmed data does not anticipate the aforementioned changes in flight path.

The present invention overcomes the problems due to lack of navigational descent information by providing a navigational system which can be rapidly manipulated in-flight by the aircraft crew members to provide visual information to the aircrew in the form of both geometric and alphanumerical displays so that the pilot can control the descent of the aircraft by referring to the display provided in the aircraft cockpit.

II. OPERATION OF THE AIRCRAFT NAVIGATION SYSTEM

In order to provide the visual descent guideslope information, there is shown in FIG. 1 an aircraft navigational system including conventional components such as a digital computer 20 interconnected with a data input device 22, hereinafter referred to as control display unit (CDU), and a horizontal situation indicator 24. Horizontal situation indicator (HSI) 24 includes a symbol generator 26 and a cathode ray tube (CRT) screen 30 for the geometric display of NAVAIDS, guidepoints, aircraft route of flight, as well as aircraft track and heading information. CDU 22 and CRT 30 are located in the aircraft cockpit to allow interfacing with the aircrew. Control display unit 22 includes an alphanumeric keypad 32, with dedicated mode keys which operate as a primary method for entering navigational data into computer 20 during inflight operation as well as for controlling the display of data geometrically at CRT screen 30 and alphanumerically at a display screen 36 located on the front of CDU 22.

Computer 20 is interconnected with the aircraft's inertial navigation system (INS) as well as with various sensor systems aboard the aircraft which make measurements such as aircraft altitude and airspeed and then relay this information to computer 20. Conventional navigational and positional data is supplied from computer 20 to symbol generator 26 which generates the required symbology and interface signals for CRT display. The data supplied by computer 20 includes (i) map background information such as location of guidepoints, NAVAIDS, and airports relative to the aircraft, and (ii) airplane dynamic data such as track and ground speed, time/distance to next guidepoint, and computed winds. The display at HSI 24 includes two modes, (i) a map mode wherein the aircraft position is dynamically displayed relative to the flight path and to other earth referenced data such that the display is dynamically changing around the aircraft, and (ii) a plan mode wherein a portion of the flight plan route is displayed statically in reference to a guidepoint along the route. All of the symbols are drawn on the face of CRT 30 using known stroke writing techniques.

Preferably, the aircraft navigational system of the present invention utilizes air navigational equipment currently aboard the Boeing 757/767 aircraft as of July, 1985. This navigational equipment includes a Sperry Flight Management Computer, a Sperry Control Display Unit, a symbol generator manufactured by Rockwell International, Collins Division and a CRT manufactured by Rockwell.

Figure 2:
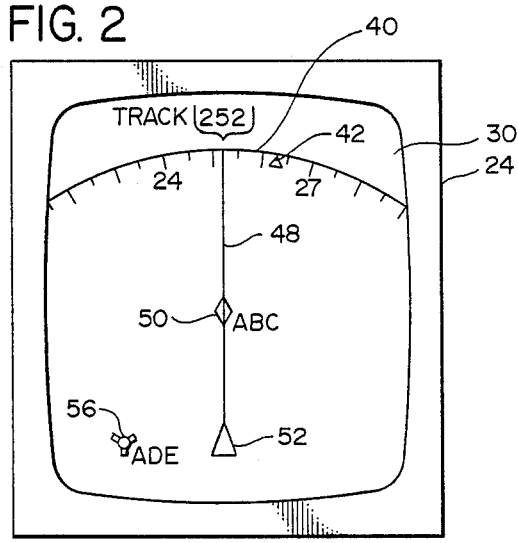
FIG. 2 is an illustration of an exemplary map-like display at the HSI showing a portion of a compass, a compass heading indicator, aircraft proposed route of flight, navigational guidepoints and NAVAIDS, and an aircraft symbol which displays the location of the aircraft relative to the proposed route of flight and guidepoints/NAVAIDS.

Utilizing the preferred aircraft navigational equipment, there is shown in FIG. 2 a conventional map mode presentation at HSI 24 for providing navigational information to the aircrew. HSI 24 includes a computer generated compass 40 and a heading indicator 42 for displaying the heading of the aircraft relative to magnetic north. In order to provide a display of geometric symbols representing the projected aircraft track, i.e. flight path, there is shown a vertically oriented track display line 48 which represents a line joining two or more waypoints 50 which define known geographical locations referenced to earth and which are stored in computer 20 and displayed via symbol generator 26. In order to provide a visual display of the geographical location of the aircraft relative to the projected flight path 48, an aircraft symbol 52 is provided at the lower end of track 48. Continuous inputs from the aircraft's inertial navigation system are provided to computer 20 to display aircraft symbol 52 at a proper geographical location relative to flight path 48 and waypoints 50. During inflight operation of the aircraft, the aircrew continuously monitors and corrects for changes in the aircraft's position relative to the projected flight path 48 by viewing HSI 24.

Also conventionally displayed at HSI 24 are programmed geographical locations representing selected NAVAIDS and waypoints such as VOR station 56, identified as "ADE", and waypoint 50 identified as "ABC". In the "map mode" position in which the aircraft position is displayed dynamically relative to the earth referenced geographical locations, a display of the forward movement of the aircraft is provided by computer 20 and symbol generator 26 wherein the earth referenced points such as NAVAID 56 and waypoint 50 are continuously moving in a downward direction relative to aircraft symbol 52. As the aircraft continues on its flight, succeeding NAVAIDS 56 and waypoints 50 are displayed at the top of CRT screen 30, in order to represent the progress of the aircraft along its projected route of flight.

Figure 3:
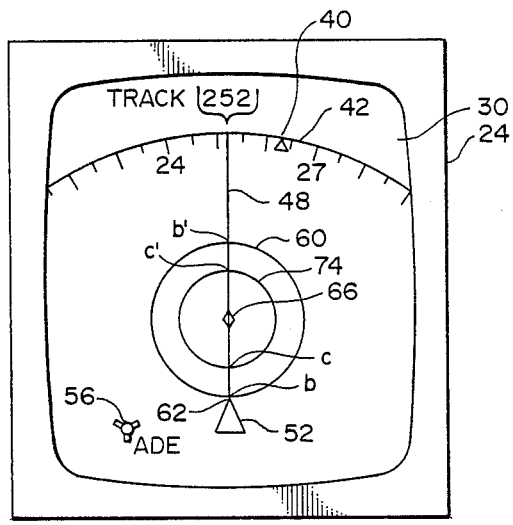
FIG. 3 is an exemplary display at the HSI including circular guidemarkers for providing a visual representation of the position of the aircraft relative to (i) an optimum clean idle descent guideslope, and (ii) a speed brakes extended, idle descent guideslope, wherein the nose of the aircraft symbol is contiguous with the outer guidemarker indicating that the aircraft is on the optimum clean idle descent path, but below the speed brakes extended, idle descent guideslopes.
Figure 4:
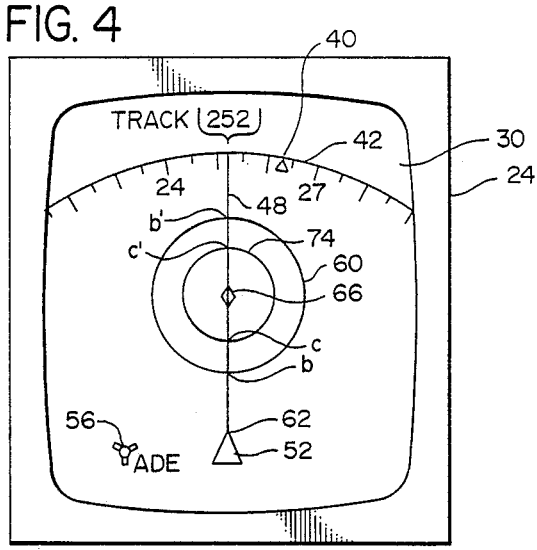
FIG. 4 is an illustration of the exemplary display of FIG. 3 wherein the guideslope markers are above the aircraft symbol indicating that the aircraft is below the optimum descent guideslopes.
Figure 5:
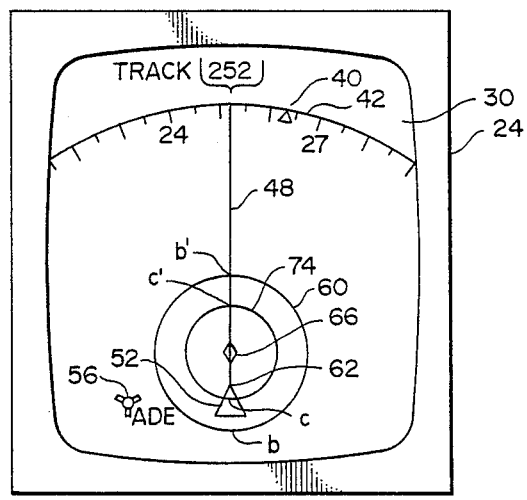
FIG. 5 is another illustration of the exemplary display of FIG. 3 wherein the guideslope markers are below the nose of the aircraft symbol indicating that the aircraft is above the optimum clean, idle descent and speed brakes extended descent guideslope.

In accordance with the present invention, manipulation of CDU keypad 32 in a manner to be described further hereinafter, generates a clean, idle descent guideslope marker 60 shown in FIG. 3 which is displayed at CRT 30. By the term "clean idle descent", it is meant that the aircraft is descending with the throttle pulled back to a location near its minimum operating setting, and the aircraft is operating in a clean aerodynamic configuration where the aircraft drag inducing devices such as speed brakes, spoilers, and landing gear, are in their retracted, minimum drag configurations. In an exemplary embodiment, guideslope marker 60 is in the form of a circle which is bisected at lower point b and upper point b' by flight track line 48. Instead of a circle, guideslope marker 60 may comprise two line segments (not shown) which intersect flight track 48 at right angles to define intersection points corresponding to points b and b'. Guideslope marker 60 is displayed at CRT 30 so that when the aircraft is descending on the calculated optimum clean, idle descent guideslope, nose 62 of aircraft symbol 52 is located contiguous with lower point b of guideslope marker 60 as shown in FIG. 3. In order to remain on the optimum descent guideslope and maintain the optimum descent of the aircraft, the aircraft pilot adjusts the rate of descent of the aircraft by observing the display. If the aircraft is below the optimum descent guideslope, guideslope marker 60 is located upward from aircraft nose 62 as shown in FIG. 4, indicating to the aircrew that the aircraft's rate of descent must be decreased to bring the aircraft up and onto the recommended guideslope path. As the aircrew adjusts the aircraft controls to descend at a slower rate, the distance between point b on the guideslope marker 60 and nose 62 of aircraft symbol 52 decreases at a rate proportional to the rate at which the aircraft approaches the guideslope path. This allows the pilot to adjust the aircraft rate of descent when approaching the guideslope path. In the event the aircraft is above the calculated clean, idle descent guideslope path, point b on the guideslope marker 60 is located below nose 62 as shown in FIG. 5, indicating to the pilot that the aircraft rate of descent must be increased.

The display at HSI 24 includes an end of descent (E/D) symbol 66 which is located at the center of guideslope marker 60 and which represents an end of descent waypoint which represents a preselected distance above a preselected earth referenced geographical location. Typically, the end of descent waypoint is either the destination airport, the outer marker associated with the active destination runway, the destination runway threshold or a destination approach waypoint serving the active runway. The end of descent waypoint is stored in the memory of computer 20 prior to takeoff and then can be recalled from memory and displayed at CRT 30 by manipulation of CDU keypad 32.

Figure 6:
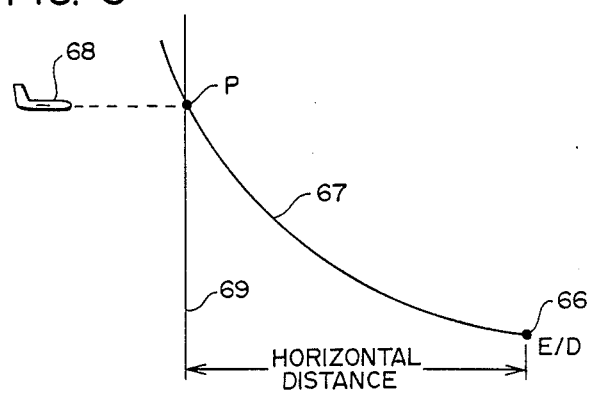
FIG. 6 is a diagram of an exaggerated side profile of an optimum clean, idle descent guideslope including a point P on the guideslope profile which is located at the present altitude of the aircraft, and defining a horizontal distance between an end of descent waypoint and a vertical line drawn through point P.
Figure 7:
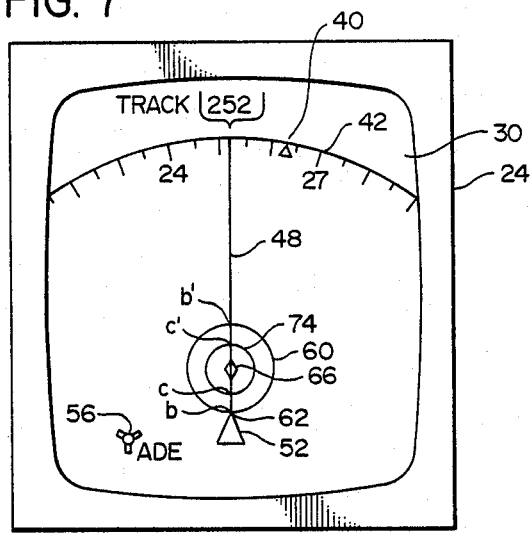
FIG. 7 is another illustration of the exemplary display of FIG. 3 wherein the clean, idle descent guideslope circle is contiguous with the nose of the aircraft symbol indicating that the aircraft is on the optimum clean idle descent guideslope, and wherein the diameters of the guide markers in the present embodiment are smaller than the diameters of the corresponding guidemarkers in FIG. 3 indicating a decreased horizontal distance between the aircraft and the end of descent waypoint.

The radius of guideslope marker 60 is proportional to the horizontal distance between the end of descent waypoint 66 and a vertical line intersecting a point on the optimum guideslope which is at an altitude equal to the aircraft's altitude. For example, a somewhat exaggerated side profile 67 of a clean, idle descent optimum descent guideslope is shown in FIG. 6. The present position of aircraft 68 is below the optimum descent guideslope. The present altitude of the aircraft below the optimum descent guideslope corresponds to an altitude which corresponds to point P on guideslope profile 67. The radius of guideslope marker 60 is proportional to the horizontal distance between the end of descent waypoint 66 and a vertical line 69 extending through point P. As the aircraft approaches the end of descent waypoint 66, the radius of guideslope marker 60 becomes smaller as shown in FIG. 7. Therefore, the decreasing radius of guideslope marker 60 provides the aircrew with a visual display of the aircraft's distance to the end of descent waypoint 66.

Conventionally, CDU 22 includes dedicated mode keys for accessing corresponding pages of memory from computer 20 and for displaying the accessed pages at CDU screen 36. CDU 22 also includes line select keys 70, shown in FIG. 8, located in columns at opposite sides of CDU screen 36 for transferring data between rows of the selected page, and for accessing other pages by activating the line select key 70 corresponding to the line on which the selected page appears. In accordance with the present invention, a page containing alphanumerical data dedicated to Energy Management flight descent information is selected. When the Energy Management page appears at CDU screen 36, guideslope marker 60, as well as end of descent waypoint 66 appear at CRT screen 30. In FIG. 8, the display of the Energy Management page includes data which identifies NOLLA as the end of descent waypoint, the horizontal distance to go (DTG) from the aircraft's present position to NOLLA, e.g. 125 nautical miles, as well as the assigned speed and altitude upon reaching NOLLA, e.g. 170 knots and 2200 feet. Line 2 displays the horizontal distance to go from the aircraft's present position to the optimum clean, idle descent guideslope, e.g. 25 nautical miles. The distance to go from the aircraft's present position to the idle descent guideslope is measured along a radial beginning at the aircraft and ending at the end of descent waypoint 66. Line 3 displays the horizontal distance to go from the aircraft's present position to a speed brake (drag) required guideslope to be discussed in further detail later. The airspeed (REQ SPD) used to compute the altitude and horizontal distance components of the segment of the guideslope on which the aircraft is currently flying is displayed at line 4. If the REQ SPD displayed at line 4 is maintained, the aircraft will remain on the calculated guideslope, assuming ideal conditions. The Energy Management page also displays a reference altitude (REF ALT) as a function of horizontal distance to go (DTG) which may be compared by the aircrew with the actual altitude of the aircraft to guide the aircraft along the calculated guideslope.

As indicated previously, the aircraft's descent guideslope is calculated to obtain maximum fuel economy, i.e. where the aircraft is in a clean configuration and the engines are at or near idle rpm. The distance relative to the ground over which the aircraft travels in a clean descent when the engines are at idle is a function of several variables including aircraft altitude, indicated airspeed and prevailing winds. This distance information is stored in a lookup table in computer 20 for use in calculating the optimum clean, idle descent guideslope. However, sometimes an aircraft is required to descend at a faster rate than is feasible in a clean, idle configuration. The aircraft rate of descent may be increased by deploying the aircraft speed brakes to increase the drag of the aircraft. In order to provide the aircrew with a visual display for directing the aircraft in a speed brake extended, idle descent, HSI 24 displays a second guideslope marker 74 (FIG. 3) which is located concentrically within idle descent marker 60. Guideslope marker 74 is bisected by flight track 48 at lower point c and upper point c'. Therefore when nose 62 of aircraft symbol 52 is contiguous with speed brake descent marker 74 at point c, the aircraft is descending at the optimum calculated rate with speed brakes extended in order to arrive at the geographical location of the end of descent waypoint 66, simultaneously with arrival of the aircraft at the assigned altitude of the end of descent waypoint 66. When point c of guideslope marker 74 is above nose 62 of aircraft symbol 52 (FIG. 5), as in FIGS. 3 or 4, the aircraft is below the calculated guideslope for a speed brakes extended idle descent, whereas when point c is below nose 62 of aircraft symbol 52 (FIG. 5), the aircraft is above the calculated guideslope for a speed brakes extended, idle descent. In addition, as the aircraft descends on the optimum descent guideslope, the radius of guidemarker 74 decreases in proportion to the horizontal distance to the end of descent waypoint 66.

In order to illustrate the operation of the present invention, an air navigation system is described which does not incorporate the descent guidance information of the present invention. An imaginary flight is described from a departure airport to a destination airport which has an instrument approach outer marker beacon NOLLA bearing 170°, twenty five miles, from the destination airport, and an altitude of 2200 feet. The aircraft takes off from the departure airport and reaches an assigned cruise altitude of 35,000 feet according to the programmed flight plan. In order to save fuel, an idle descent at 300 KIAS is programmed to begin from cruise altitude seventy five miles from a waypoint NOLLA on a heading of 340°. The programmed flight plan calls for the aircraft to cross NOLLA at an assigned airspeed of 170 KIAS. As the aircraft approaches the programmed descent point seventy five miles from NOLLA, the aircraft is instructed by ground control to maintain its present altitude for another twenty five miles, and is given a heading change left 45° from present heading. At fifty miles from NOLLA, the aircraft is cleared to descend to 2200 feet and is given an additional vector left 45° from the previously assigned heading. At this time, the programmed idle descent airspeed is of little value to the aircrew because it is based on a predetermined idle descent seventy five miles from NOLLA along the programmed aircraft track. The aircraft is no longer seventy five miles from NOLLA nor on the programmed track, therefore an estimate of the required descent rate must be made by the aircrew. However, during the descent the aircraft is given another heading change by ground control. Utilizing conventional navigational systems, the aircraft will likely reach 2200 feet well before reaching NOLLA, as the aircrew typically will cause the aircraft to descend at a faster rate than is necessary to ensure the aircraft is at the assigned altitude and airspeed when reaching NOLLA. Therefore, by arriving at 2200 feet before reaching NOLLA, the aircrew must add power to maintain the assigned altitude of 2200 feet while burning additional fuel as the aircraft continues to NOLLA.

In order to further understand the present invention, the aforementioned imaginary flight will be described with reference to a flight utilizing the guidance information of the present invention. When the aircrew receives instructions that a descent to 2200 feet will begin at fifty miles from NOLLA, the Energy Management page is selected and guideslope markers 60, 74 automatically appear at HSI 24 indicating where a clean idle descent and a speed brakes idle descent can be commenced from cruise altitude to simultaneously reach the assigned geographical location, altitude, and airspeed of NOLLA. The pilot simply flies the aircraft in a manner that nose 62 of aircraft symbol 52 remains contiguous with descent marker 60. If, for example, the idle descent marker 60 is located above nose 62 aircraft symbol 52, as in FIG. 4, the pilot decreases the aircraft descent rate temporarily until point b is contiguous with nose 62 of aircraft symbol 52. Since the radius of markers symbols 60, 74 are independent of the flight path of the aircraft, when the aircraft is required to make heading or altitude changes, the location of guideslope markers 60, 74 remain indicative of the location of the aircraft relative to the optimum descent guideslope.

III. OVERVIEW OF THE CALCULATION OF THE OPTIMUM DESCENT GUIDESLOPE

Computer 20 is responsible for calculating the optimum guideslope and for comparing the position of the aircraft with the optimum guideslope to generate outputs (i) to CDU screen 36 for generation of alphanumerical data defining the descent guideslope in terms of a reference altitude as a function of the horizontal distance to go (DTG), and (ii) to HSI 24 for displaying guideslope markers 60, 74 to aid the aircrew in flying the aircraft along the calculated descent guideslope.

Computer 20 is a progammable digital computer having a memory section for storage of guidepoint data such as the end of descent waypoint 66. These guidepoints define geographical locations along the route of flight which are automatically displayed at CRT screen 30 and CDU screen 36 (FIG. 1), or which may be recalled by their named identifier via keypad 32 for display. Computer 20 also includes an arithmetic unit for performing the calculations to generate a flight plan route including the optimum descent guideslope of the present invention.

Figure 15A:
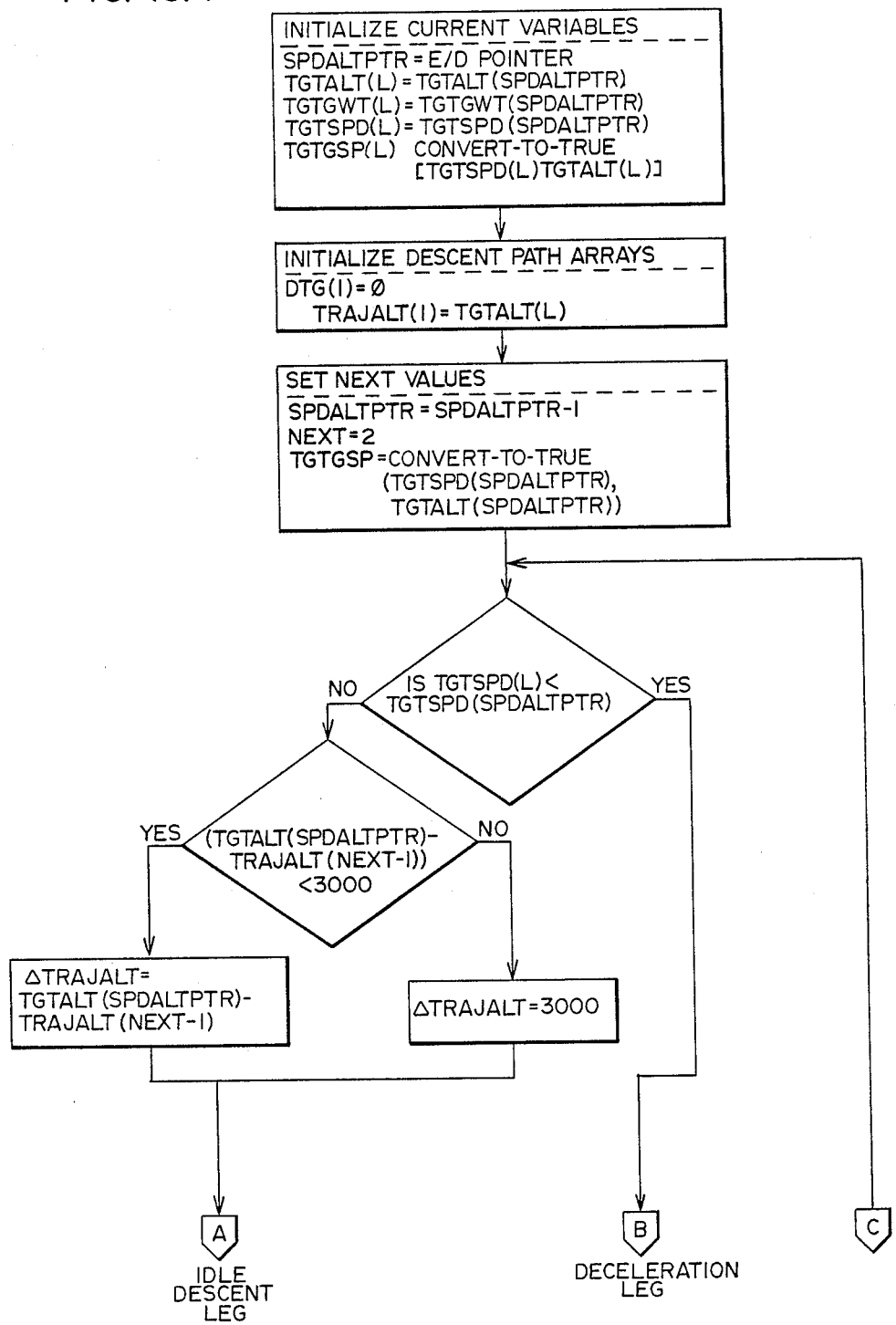
FIGS. 15A and 15B illustrate a detailed flow chart of the functional steps described in FIG. 10 for creating an optimum clean idle descent guideslope.
Figure 15B:
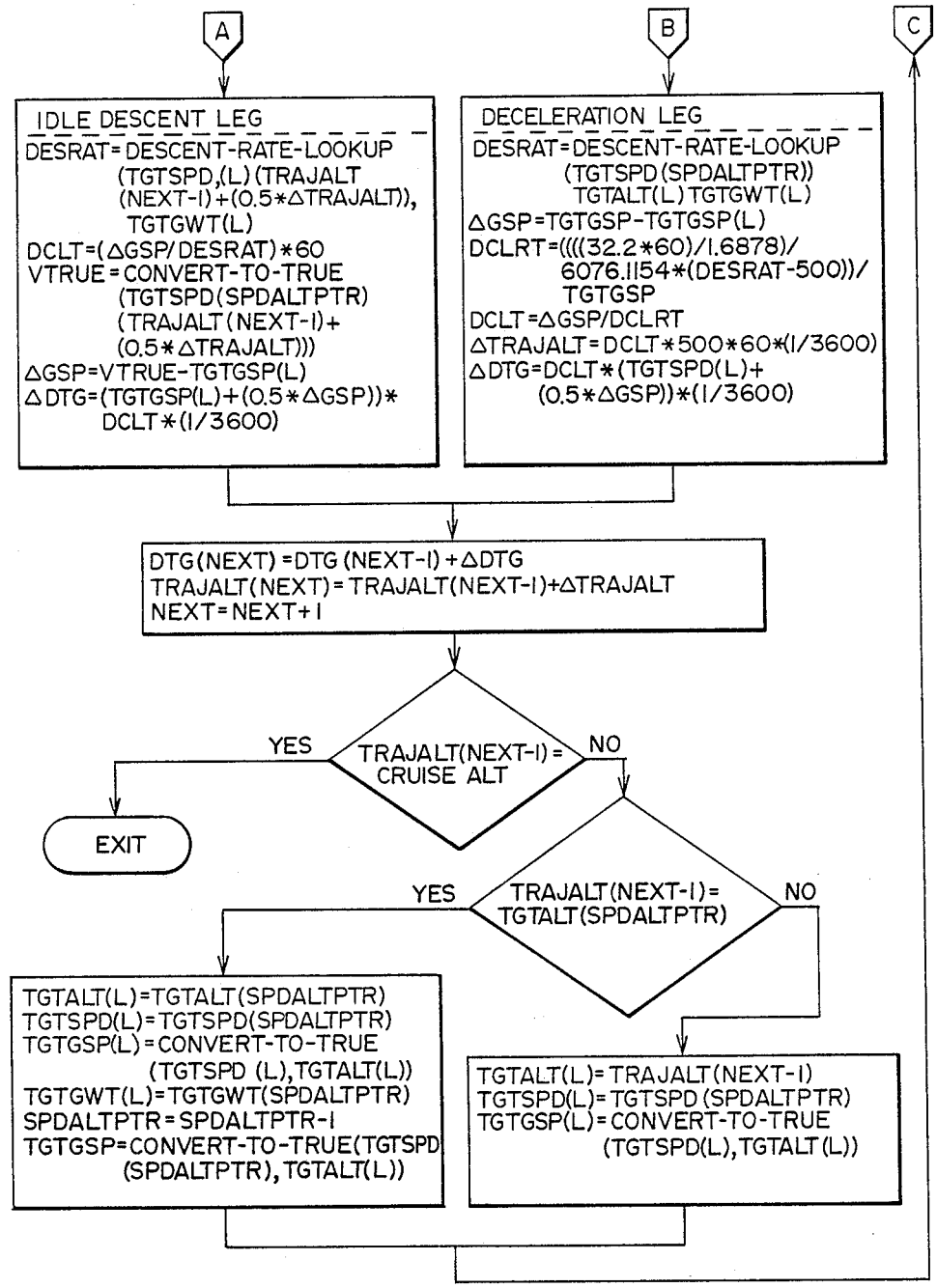

Calcuation of the optimum descent guideslope is accomplished by software, stored in the memory of computer 20, which causes the performance of a number of functional operations which are described in FIG. 10 in the form of an overview flow chart, and which are further described in FIGS. 15A and 15B in the form of a more detailed flow chart to be discussed later.

In an exemplary embodiment, an optimum clean, idle descent guideslope is calculated which meets aviation regulations regarding airspeed and altitude, as well as meets requirements for maximum fuel efficiency. A series of aircraft descent transitions are utilized to define the descent guideslope in terms of assigned aircraft altitudes and airspeeds. These transitions, shown in FIG. 9 and identified by cardinal numbers 1 through 4, define a clean, idle descent guideslope wherein aircraft cruise Mach airspeed is maintained during descent from cruise altitude (#1) until a calibrated airspeed transition is reached (#2), and whereupon the calibrated airspeed is maintained in a further descent. As is generally known, calibrated airspeed is equivalent to indicated airspeed which has been corrected for instrument error, whereas indicated airspeed is a function of airflow dynamic pressure. Therefore, by holding a constant Mach during descent from cruise altitude, the calibrated airspeed (CAS) increases. Upon reaching the calibrated airspeed of the cruise Mach to CAS transition (#2), the aircraft angle of descent is decreased to maintain that calibrated airspeed. The calibrated airspeed is maintained until approaching 10,000 feet altitude (#3) where the airspeed is slowed to 240 KIAS. The 240 KIAS descent airspeed is maintained until approaching the end of descent waypoint (#4) where the airspeed is slowed to the end of descent airspeed, e.g., 170 KIAS. It should be appreciated that the actual cruise Mach to calibrated airspeed transition (#2) may vary based upon an analysis of fuel savings versus time available to reach the aircraft destination. However, the 240 KIAS/10,000 feet transition (#3) is governed by a federal aviation requirement that aircraft airspeed be less than 250 KIAS when the aircraft is below 10,000 feet.

In order to calculate the optimum descent guideslope, the upper leg of the calculated descent guideslope is defined by a top of descent transition (#1) (FIG. 9) which identifies the transition from cruise altitude, and by the cruise Mach/CAS transition (#2). The upper leg represents a constant cruise Mach descent which results in a constantly increasing calibrated airspeed. The altitude at which the assigned cruise Mach intercepts the assigned calibrated airspeed is calculated in a conventional manner. For purposes of calculating the descent guideslope however, the upper leg is approximated as a constant calibrated airspeed leg utilizing an average calibrated airspeed over the upper descent leg. Furthermore, the middle leg of the calibrated descent guideslope is defined by the cruise Mach/CAS transition (#2) and the 240 KIAS/10,000 feet transition (#3); whereas the lower leg is defined by the 240 KIAS/10,000 feet transition (#3) and the end of descent waypoint (#4). The middle and lower legs each include a constant calibrated airspeed segment and a deceleration segment; the deceleration segment defining that portion of the leg where transition is made to the airspeed of the next lower transition.

It should be appreciated that the calculated descent guideslope of the present embodiment is somewhat curved due to the fact that during the middle and lower legs, a constant calibrated airspeed is maintained during the aircraft descent causing the true airspeed of the aircraft to decrease. In the upper leg a constant Mach is maintained causing the true airspeed of the aircraft to increase as the aircraft descends. In addition, a curved profile results during those deceleration segments when the aircraft slows to the speed of the next lower transition. Due to the fact that the descent legs have a curved profile, in order to increase the accuracy of the calculated descent guideslope, the constant cruise Mach and constant calibrated airspeed segments are divided into a number of further subsegments by a plurality of intermediate points, e.g., points A, B, C, D, E of the lower leg in FIG. 9. Each of these intermediate points is defined by an altitude component and horizontal distance component from the end of descent waypoint. In summary, the calculated descent guideslope is defined by a number of descent points, each of which represents (i) an altitude (TRAJALT) above the end of descent waypoint and (ii) a horizontal distance (DTG) from the end of descent waypoint.

In order to calculate TRAJALT and DTG to define each guideslope descent point (A, B, C . . . ) of the optimum calculated guideslope (FIG. 9), the descent guideslope is calculated in a direction opposite to that direction in which it is flown i.e. by starting at the end of descent waypoint (#4) and proceeding upward to the top of descent transition (#1). The segments forming the optimum descent guideslope are identified beginning with a first segment which is defined by the end of descent waypoint (#4) and the next descent point (#3) of that segment. Calculation of the altitude component, $\Delta$TRAJALT, and distance to go component, $\Delta$DTG, for each segment will depend upon whether that segment is a nondecelerating segment, e.g. segment DE of the lower leg, or a decelerating segment, e.g. AB of the lower leg. Referring to FIG. 10, a determination is first made whether the calibrated airspeed at the lower end point of the first segment [TGTSPD(L)], e.g., 170 KIAS, is less than the calibrated airspeed at the upper end of the lower leg [TGTSPD(SPDALTPTR)], e.g. 240 KIAS. IF the condition is false, i.e. the airspeed at the upper end of the lower leg is equal to or greater than the airspeed at the lower end of the first segment, then the first segment is treated as a constant airspeed (calibrated or Mach) segment, and the change in altitude component, ($\Delta$TRAJALT) and change in horizontal distance component ($\Delta$DTG) of that constant airspeed segment are calculated utilizing a constant airspeed routine to be discussed hereinafter. On the other hand, if the aforementioned condition is true and the first segment is determined to be a deceleration segment, the change in altitude component ($\Delta$TRAJALT) and change in horizontal distance component ($\Delta$DTG) of the deceleration segment are determined utilizing a deceleration routine also to be discussed hereinafter.

Once the values of $\Delta$TRAJALT and $\Delta$DTG are determined, utilizing the respective routines, they are added to previously stored values of TRAJALT and DTG respectively, and the resulting sums are stored in their respective indexed arrays in computer 20. A determination is then made whether the latest calculated value of TRAJALT is equal to the assigned cruise altitude. If they are equal, the descent guideslope calculation is complete and no other segments are computed. However, if the altitudes are not equal, then additional segments are required to be calculated to complete the descent guideslope. Thus, the aforementioned functional steps are repeated for the second segment (FIG. 9), by first determining whether the airspeed at the upper end point of the lower segment, e.g., 240 KIAS, is less than the airspeed at the upper transition of the lower leg, e.g. 240 KIAS. If the condition is false as it is in this example, then the next segment (second segment)

is treated as a constant airspeed segment and the constant airspeed routine is used to calculate the ΔTRAJALT and ΔDTG of that segment. Once ΔTRAJALT and ΔDTG are determined for the second segment, they are added to the previously calculated values of TRAJALT and DTG, and then stored in their respective arrays. Calculation of ΔTRAJALT and ΔDTG for additional segments continues until the latest value of TRAJALT is equal to the aircraft's cruise altitude.

Since the optimum descent guideslope is calculated with reference only to one fixed geographical location i.e. the end of descent waypoint 66, the optimum descent guideslope is independent of the heading or flight path of the aircraft. Therefore, changes in aircraft heading or changes in assigned aircraft altitudes do not affect the calculated descent guideslope. These changes, however, are reflected in a change in location of the aircraft relative to the calculated descent guideslope.

IV. ALPHANUMERICAL DISPLAY OF THE OPTIMUM DESCENT GUIDESLOPE

Figure 9:
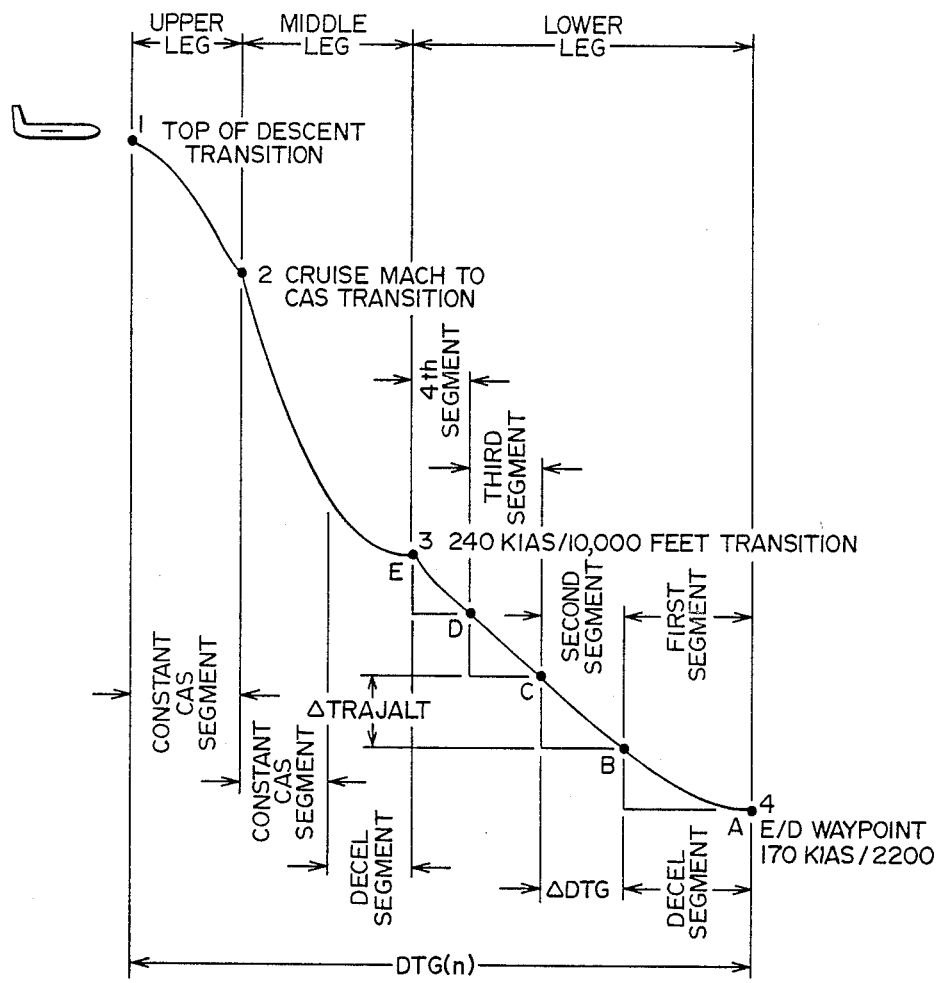
FIG. 9 is a somewhat exaggerated diagrammatic side profile of an optimum clean idle descent guideslope wherein the clean idle descent guideslope is shown as a series of legs defined by various transition airspeed/altitudes.
Figure 11:
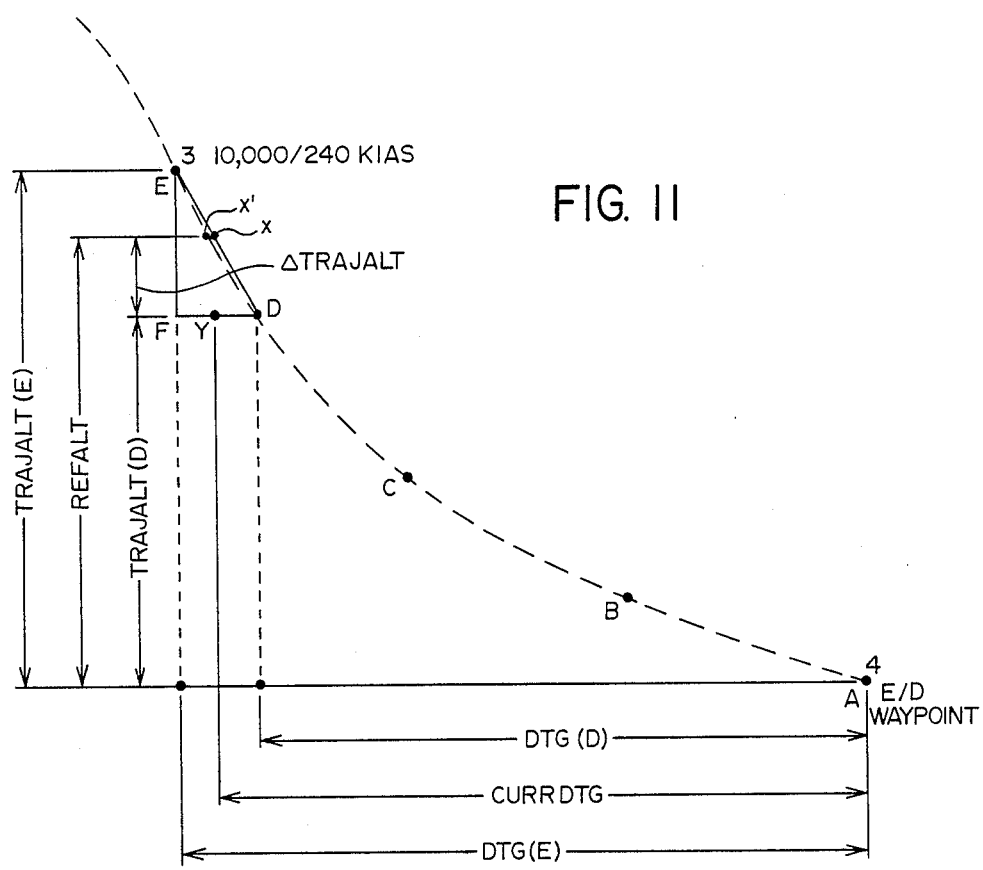
FIG. 11 is a somewhat exaggerated diagrammatic side profile of one leg of the optimum clean idle descent guideslope which has been divided into a plurality of segments by points A through E, wherein the curved segments, such as DE, are approximated by straight line segments, such as the line connecting points D and E.
Figure 12:
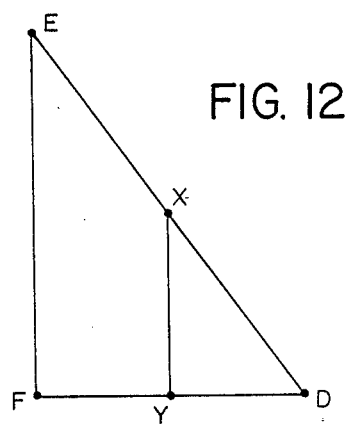
FIG. 12 is a diagram of similar triangles DXY and DEF utilized to calculate the length of XY in order to determine the trajectory altitude component.

As discussed previously, once the descent points defining the optimum descent guideslope are determined, in order to provide an alphanumerical presentation of the optimum guideslope at CDU screen 36, a reference altitude (REF ALT) is displayed on the Energy Management page of CDU 22 as a function of the current horizontal distance to go (DTG) of the aircraft to the end of descent waypoint. While the aircraft is at cruise altitude, the horizontal distance between the aircraft and the end of descent waypoint, hereinafter referred to as CURR DTG, is calculated in a conventional manner by computer 20 utilizing inputs from the aircraft inertial navigation system, and the programmed location of the end of descent waypoint. Referring to FIGS. 9 and 11, as long as the horizontal distance to go of the aircraft (CURR DTG) to the end of descent waypoint is greater than the horizontal distance to go (DTG [n]) from the top of descent transition to the end of descent waypoint, the assigned cruise altitude of the aircraft is displayed on the Energy Management page. However, when the CURR DTG of the aircraft is less than DTG (n), a reference altitude (REFALT) will be displayed which defines a point on the optimum descent guideslope. By comparing REF ALT with the aircraft altimeter reading, the aircrew can determine the altitude of the aircraft in relation to the calculated descent guideslope.

Calculation of the reference altitude is accomplished by referring to FIG. 11 which illustrates the lower leg of the optimum descent guideslope and which is defined by the 10,000 foot/240 KIAS transition (#3) and the end of descent waypoint (#4). The lower leg is divided into segments formed by intermediate points A through E, with each intermediate point formed by values of DTG and TRAJALT stored in computer 20 as discussed previously. In order to calculate REF ALT as a function of CURR DTG, computer 20 performs a number of functional steps beginning with an identification of the set of adjacent altitudes (TRAJALT) between which the current altitude lies. This calculation is made by comparing CURR DTG to the arrayed values of DTG stored in computer 20 to determine between which set of adjacent DTG's, CURR DTG lies, and then by retrieving the values oF TRAJALT corresponding to those adjacent DTG's which bracket CURR DTG. In FIG. 11, for example, once it is determined that CURR DTG lies between DTG (D) and DTG (E), the reference altitude is calculated as follows:

$$REF\ ALT = TRAJALT(D) + \Delta TRAJALT + E/D \text{ altitude}$$

where a point X' on the curved optimum guideslope, representing the current distance to go (CURR DTG) of the aircraft, is closely approximated by a point X on the straight line joining adjacent leg segment endpoints D, E. A larger right triangle is formed by sides DE, EF, and FD, wherein EF represents the change in altitude ΔTRAJALT between endpoints D, E; and DF represents ΔDTG between endpoints D, E. A smaller right triangle is formed by sides DX, XY, and YD, wherein XY represents the quantity ΔTRAJALT, and YD represents the distance between the CURR DTG and DTG(D).

By the law of similar triangles

Figure 13:
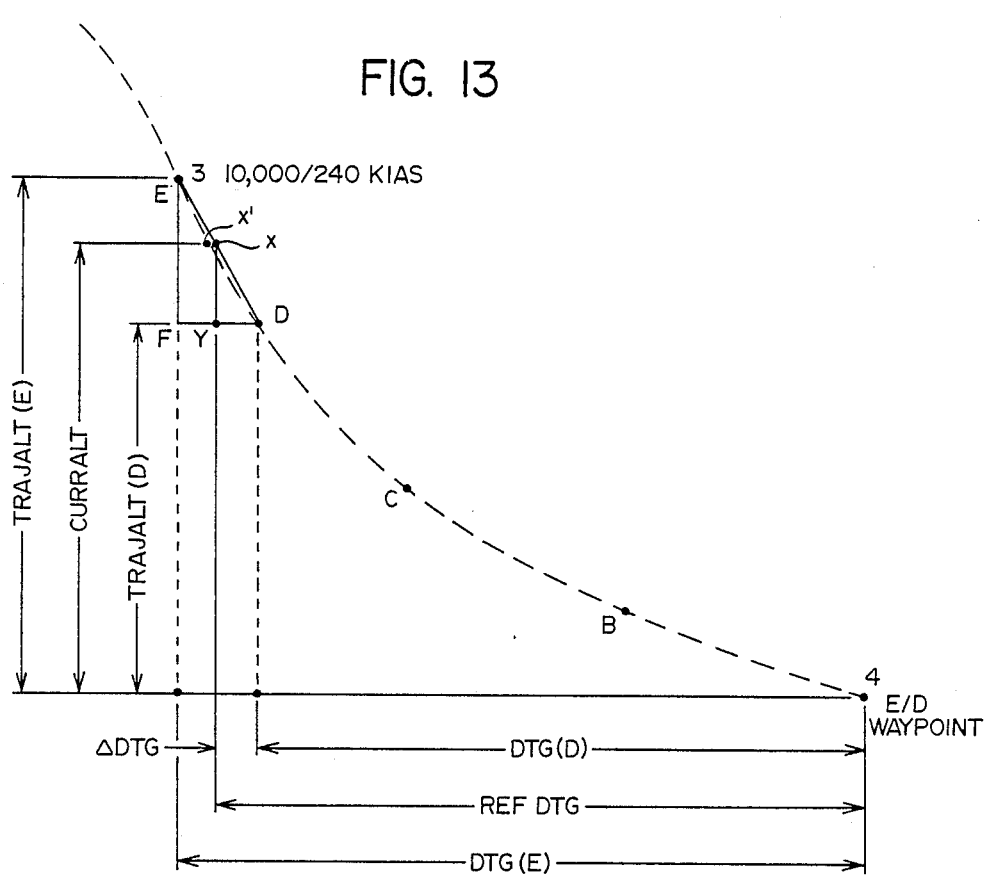
FIG. 13 is a somewhat exaggerated diagrammatic side profile of the descent leg shown in FIG. 11, wherein the optimum horizontal distance to go to the end of descent waypoint is determined by the triangle formed by segment DE and sides EF and DF.

Triangle $DEF \cong$ Traiangle $DXY$ FIG. 13)

therefore:

$$\frac{EF}{FD} = \frac{XY}{YD}$$

or $$XY = \frac{EF}{FD} * YD$$

$$EF = TRAJALT(E) - TRAJALT(D)$$

$$FD = DTG(E) - DTG(D)$$

$$YD = CURR\ DTG - DTG(D)$$

therefore:

$$REF\ ALT = TRAJALT(D) +$$

$$\frac{TRAJALT(E) - TRAJALT(D)}{DTG(E) - DTG(D)} *$$

$$[CURR\ DTG - DTG(D)] + E/D \text{ altitude}$$

As CURR DTG changes during the aircraft descent toward the end of descent waypoint, computer 20 continuously updates and displays REF ALT at the Energy Management page on CDU screen 36 so the aircrew has an alphanumerical representation of the optimum descent guideslope. By comparing the aircraft's present altitude with REF ALT, the aircrew can adjust the aircraft's rate of descent to reach and then maintain the optimum descent guideslope.

V. GEOMETRICAL DISPLAY OF THE OPTIMUM DESCENT GUIDESLOPE RELATIVE TO THE AIRCRAFT

Once the descent points defining the optimum descent guideslope are determined by computer 20, in order to provide a geometrical display of the optimum guideslope at HSI 24, a similar calculation to that described with reference to the alphanumerical display is performed. However, in the present embodiment, markers 60, 74 (FIG. 3) are displayed at HSI 24 relative to aircraft symbol 52 in a manner that the radii of markers 60, 74 represent a reference distance to go (REF DTG) as a function of the current altitude of the aircraft which is available from the aircraft altimeter. In FIG. 13, the lower leg of the calculated guideslope defined by endpoints A through E is shown. A segment of the guideslope leg is defined by points D and E and approximated by line segment DE. A point on line segment DE which closely approximates point X' on segment DE is represented by X. The horizontal distance between X and the end of descent waypoint (#4) represents the reference horizontal distance to go (REF DTG). The altitude of the aircraft above sea level is fed to computer 20 from the aircraft's altimeter and from which is subtracted the altitude of the end of descent waypoint to generate a value of aircraft altitude (CURR ALT) above end of descent waypoint. Calculation of REF DTG as a function of CURR ALT begins by comparing the quantity (CURR ALT—E/D ALTITUDE) to the arrayed values oF TRAJALT stored in computer 20 to determine between which set of adjacent TRAJALT's, CURR ALT lies, and then by retrieving the values of DTG, e.g. DTG(D), DTG(E), corresponding to those adjacent TRAJALT's which bracket CURR ALT. Calculation of REF DTG is accomplished as follows:

$$REF\ DTG = DTG\ (D) + \Delta DTG$$

Figure 14:
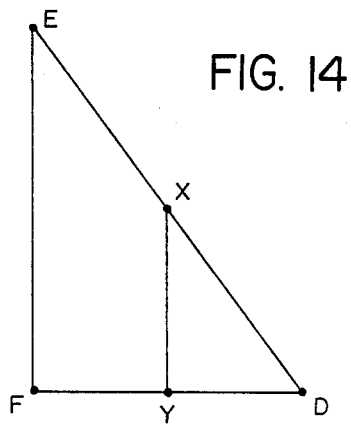
FIG. 14 is a diagram of similar triangles DXY and DEF used to calculate the length of YD in order to determine the horizontal distance to go component.

By definition, $\Delta DTG = YD$ (FIG. 13)
By the law of similar triangles:

Triangle $DEF$ = Triangle $DXY$ (FIG. 14)

Therefore:

$$\Delta DTG = YD = FD/EF \cdot XY$$

where YD represents the difference between REF DTG and DTG(D), and XY represents the difference between CURR ALT and TRAJALT(D). Therefore, $$REF\ DTG = \frac{[DTG\ (E) - DTG\ (D)]}{TRAJALT\ (E) - TRAJALT\ (D)} \cdot [CURR\ ALT - TRAJALT\ (D)] + DTG\ (D)$$

As discussed previously, guideslope markers 60, 74 may be displayed as circles at HSI 24. The radius of the circle defining guideslope marker 60 is equal to REF DTG. Guideslope marker 60 is generated at HSI 24 in a manner described in applicant's related application, Ser. No. 716,979, filed Mar. 28, 1985 which discloses apparatus and methods for creating circular displays; the contents of which are incorporated herein by reference. Therefore, XLAT/XLONG in applicant's related application corresponds to the end of descent waypoint in applicants' present application; and the radius of the circular display (XRAD) corresponds to REF DTG of applicant's present application. As the altitude of the aircraft changes during descent, new values of REF DTG are fed to symbol generator 26 to generate guideslope marker 60, having a radius equal to the horizontal distance between the end of descent waypoint and a point on the optimum descent guideslope having an altitude equal to the current altitude of the aircraft.

VI. DETAILED DISCUSSION OF THE CALCULATION OF THE OPTIMUM DESCENT GUIDESLOPE

Figure 10:
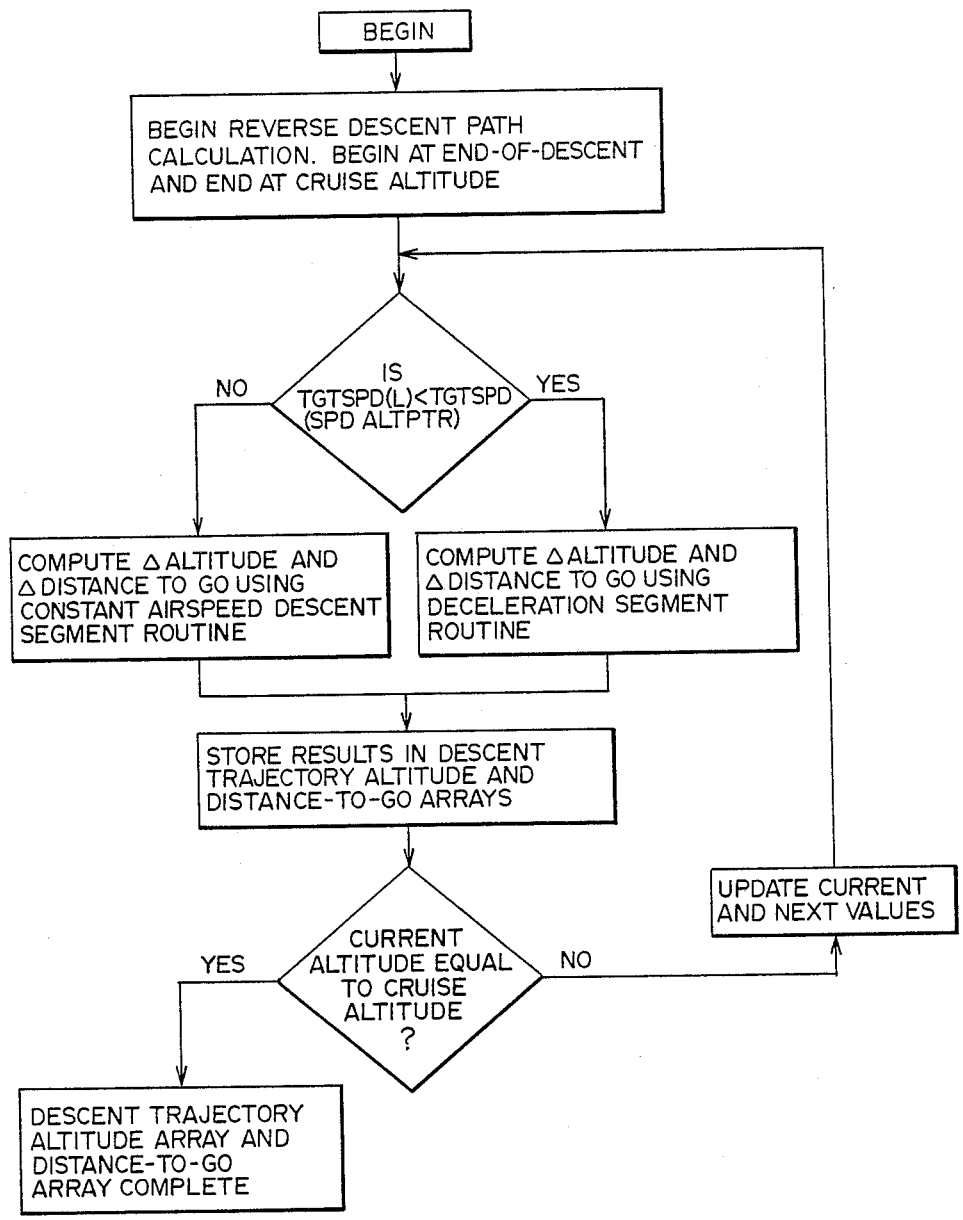
FIG. 10 is a flow chart describing an overview of functional steps for creating an optimum clean idle descent guideslope.

As described in the broad overview with reference to FIG. 10, calculation of the optimum clean idle descent guideslope is accomplished by starting at the end of descent waypoint and then by calculating the optimum guideslope in accordance with the assigned airspeed/altitude constraints such that each descent leg is divided by a plurality of descent points defining either constant airspeed or deceleration segments. Referring to the flow chart in FIGS. 15A and 15B, after the current variables as well as the DTG and TRAJALT arrays have been initialized, a descent leg index pointer (SPDALTPTR=SPDALTPTR−1) is defined, and aircraft airspeed (TGTSPD) is converted to true airspeed based upon the current aircraft altitude at the first segment lower end point. The index pointer is initialized to the cardinal number of the end of descent waypoint e.g. "4" (FIG. 11). The airspeed/altitude transitions are assigned sequential cardinal numbers wherein the transition occurring at the end of descent waypoint is assigned the highest number and the top of descent transition is assigned the number 1. Therefore, in the exemplary embodiment, the descent leg index pointer initially accesses the end of descent waypoint (#4), and then in succession accesses the 10,000/240 KIAS transition (#3), the cruise Mach to CAS transition point (#2), and the top of descent transition (#1).

As discussed previously, a determination is made whether the first segment of the lower leg (FIG. 9) is a deceleration segment or a constant airspeed segment. If the condition is satisfied that the first segment is a deceleration segment, the deceleration rate of the aircraft is determined based upon a 500 foot per minute aircraft descent rate during deceleration from the higher airspeed [TGTSPD (SPDALTPTR)] for that leg to the lower aircraft airspeed [TGTSPD(L)] assigned to that leg. The deceleration rate (DCLRT) in knots per second is calculated as:

$$DCLRT = [(32.2*60/1.6878)/6076.1154]*[(DESRAT-500)/TGTGSP]$$

where DESRAT, the descent rate of the aircraft at the start of the descent segment, is obtained from a lookup table in computer 20; and TGTGSP equals TGTSPD (SPDALTPTR) converted to true airspeed. DESRAT is calculated in a known manner utilizing the aircraft calibrataed airspeed prior to deceleration, the altitude of segment lower end point, as well as the projected gross weight of the aircraft TGTGWT(L) at the segment lower end point.

Figure 16:
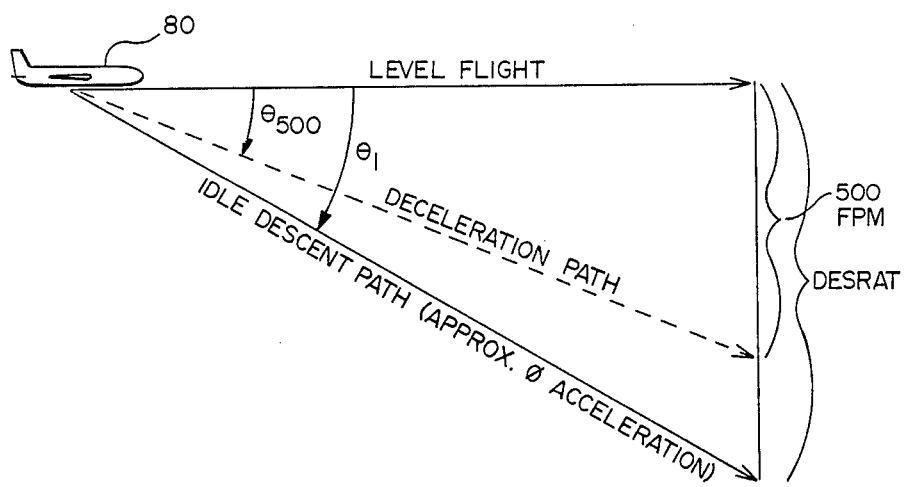
FIG. 16 is a diagrammatic side profile of the aircraft level flight path, the aircraft idle descent path and the aircraft deceleration path.

The deceleration rate (DCLRT) is derived by referring to FIG. 16 where the flight of an aircraft 80 is defined by three flight paths including (i) a level flight path (ii) a deceleration flight path which represents the deceleration path at a descent rate of 500 feet per minute and (iii) a clean, idle descent path flown at a constant calibrated airspeed. In FIG. 16, $\theta_1$, represents the angle between the level flight path and the idle descent path, and $O_{500}$ represents the angle between the level flight path and the deceleration path.

A deceleration force ($F_D$), resulting when the aircraft's rate of descent is decreased to 500 feet per minute, is calculated as:

$$F_D = L \tan(\theta_1 - \theta_{500})$$

where L = aircraft lift. Since it is known that F = ma, then $$DCLRT = \frac{F_D}{m} = \frac{L\tan(\theta_1 - \theta_{500})}{m}$$

where m=the mass of the aircraft. Assuming small angles of $\theta_1$ and $\theta_{500}$ $$\tan(\theta_1 - \theta_{500}) = \theta_1 - \theta_{500}.$$

Therefore, $DCLRT = \dfrac{L(\theta_1 - \theta_{500})}{m}$

It is also known that L=W cos t where W=the weight of the aircraft and t=the inclination of the flight path to the horizontal. Assuming for small angles of descent that cos t=1, then L=W.

Therefore:

$L = gm$ and $DCLRT = g(\theta_1 - \theta_{500})$.

Assuming small angles of $\theta_1$ and $\theta_{500}$, then $\theta_1 = (DESRAT/TGTGSP)$ and $\theta_{500} = (500/TGTGSP)$ Therefore:

$DCLRT = g(DESRAT - 500)/TGTGSP$

Since it is known that g=32.2 feet/second=32.2·60 (feet/minute); and TGTGSP in knots=TGTGSP·6076.1154·1.6878 (feet/minute), then $DCLRT = [(32.2·60/1.6878)/6076.1154]·[(DESRAT-500)/TGTGSP]$ Once the deceleration rate is determined, then the time to decelerate from TGTSPD(SPDALTPTR) to TGTSPD(L) i.e. deceleration time (DCLT), is calculated as the change in ground speed (ΔGSP) divided by DCLRT. By multiplying 500 feet per minute (NOMDCLRT), the change in altitude component (ΔTRAJALT) is determined. More specifically:

$\Delta TRAJALT = DCLT·NOMDCLRT·60·(1/3600)$

In order to compute the change in distance component (ΔDTG) of the deceleration leg, the deceleration time (DCLT) is multiplied by the calculated average ground speed of the aircraft during the deceleration leg. i.e. the aircraft groundspeed at the end of deceleration [TGTSPD(L)] added to one half the change in ground speed of the aircraft during deceleration (0.5·ΔGSP). Change in groundspeed is calculated by converting TGTSPD at an altitude midpoint of the segment to true airspeed (VTRUE), converting this quantity to a groundspeed in accordance with projected prevailing winds, and subtracting from that quantity the projected groundspeed TGTSPD(L) at the lower end of the segment. TGTSPD(L) is calculated in a conventional manner on the basis of calculated true airspeed and projected prevailing winds at the segment lower end. More specifically:

$\Delta DTG = DCLT·[TGTSPD(L) + (0.5·\Delta GSP)]·(1/3600)$

The values of ΔTRAJALT and ΔDTG are then added to the previous DTG and TRAJALT values stored in the distance to go array and descent trajectory altitude arrays.

On the other hand, returning to FIG. 15A, if the condition is satisfied that the first segment of the lower leg is a constant airspeed segment, i.e. TGTSPD(L) is not less than TGTSPD (SPDALTPTR), then each segment of the constant airspeed leg is defined by a 3,000 foot change in altitude, or until the next upper point corresponding to an airspeed/altitude transition is reached, whichever occurs first. Therefore the determination is made whether the altitude of the upper cardinal transition, e.g., transition "3" (10,000 feet/240 KIAS), minus the altitude of the lower endpoint of the current segment, is less than 3,000 feet. If the difference is greater than or equal to 3,000, a change in altitude (ΔTRAJALT) of 3,000 is utilized. If the change is less than 3,000, ΔTRAJALT is equal to the difference between the altitude of the next upper transition and the altitude of the lower endpoint of the current segment.

In order to calculate ΔDTG, the descent rate of the aircraft is retrieved from a lookup table in computer 20. This descent rate corresponds to a descent rate at a point midway between the upper and lower altitudes defining each constant airspeed segment. The time for the aircraft to descend between the aforementioned upper and lower altitudes (DCLT) is computed by dividing ΔTRAJALT by the aircraft descent rate. During a constant calibrated airspeed descent, the aircraft ground speed decreases by an amount equal to the difference between the calibrated airspeed at the upper and lower altitudes of the endpoints which define the segment. To compute the change in distance to go during a constant airspeed descent, the aircraft groundspeed at the lower end of the constant airspeed segment [TGTGSP(L)] is added to one half the change in ground speed (ΔGSP) during the segment to arrive at an aircraft average ground speed during the constant airspeed segment. This average ground speed is multiplied by the time of descent (DCLT) to generate ΔDTG. More specifically, $\Delta DTG = DCLT·[TGTGSP(L) + 0.5·\Delta GSP]·(1/3600)$ After determining ΔDTG and ΔTRAJALT, these values are added to the previously arrayed values of DTG and TRAJALT and then stored in the DTG and TRAJALT arrays under their respective indexes.

After updating the arrays, a determination is made whether the latest trajectory altitude stored in the TRAJALT array is equal to the assigned cruise altitude. If they are equal, the entire descent profile has been calculated. However, if they are not equal, then a determination is made whether the latest stored value of TRAJALT is equal to the altitude at the next upper transition. If these two values are equal then ΔDTG, ΔTRAJALT for all of the segments of the present leg have been determined and the variables TGTALT(L), TGTSPD(L), TGTGWT(L) and TGTGSP(L) are updated, SPDALTPTR is incremented to the next transition point cardinal number, e.g., transition point 2, and TGTGSP is updated. Once the variables are updated, the program returns to repeat the aforementioned calculations beginning with a determination as to whether the first segment of the next leg is a constant airspeed segment or a deceleration segment.

As was noted before, sometimes it is desirable to deploy the aircraft's speed brakes to increase the aircraft descent rate to arrive at the end of descent waypoint at the proper airspeed. In order to provide the aircrew with a visual indication of the necessity for deploying the speed brakes, marker circle 74 is displayed at HSI 24. In addition, the Energy Management page of CDU 22 (FIG. 8) displays the distance to go before it is required to fully deploy speed brakes to descend from cruise altitude to the end of descent waypoint. It can be appreciated that the rate of descent utilizing speed brakes depends on a number of factors such as the type of aircraft, degree of extension of speed brakes, aircraft gross weight, and altitude of the aircraft. This information is typically available from the aircraft operating manual and is programmed into computer 20.

In an exemplary embodiment of the present invention utilizing a Boeing 767 aircraft with speed brakes fully extended, the approximate descent rate of the aircraft is five hundred feet of descent per mile of distance traveled. In this embodiment, the radius of guideslope marker 74 (XRAD) equals the actual altitude of the aircraft (ACALT) minus the altitude of the end of descent waypoint (E/D ALT), all divided by five hundred. Specifically, $$XRAD = ACALT - E/D\ ALT/500$$

Once the value of XRAD is calculated, guide marker 74 is displayed at HSI 24 as described previously.

Although the present invention has been described in an exemplary embodiment with reference to navigational systems currently aboard Boeing 757/767 aircraft, it can be appreciated, however, that the present invention may be used with other navigational systems.

What is claimed is:

1. A method for guiding a descent of an aircraft, the method comprising the steps of:
   a. determining a position of the aircraft and providing a first output corresponding to the position;
   b. inputting information representing a lower descent position $P_0$ as well as first and second aircraft descent parameters for conducting said descent;
   c. generating a descent guideslope which is formed by at least upper and lower descent legs, in which the lower descent leg includes the lower descent position $P_0$ and an upper descent position $P_1$, and the upper descent leg includes the upper descent position $P_1$ and a further upper descent position $P_2$, in a manner that a location of the upper descent position $P_1$ relative to the lower descent position $P_0$ is calculated as a function of the first descent parameters, and a location of the further upper descent position $P_2$ relative to the upper descent position $P_1$ is calculated as a function of the second descent parameters; and
   d. guiding the aircraft in response to the first output and the descent guideslope.

2. The method as set forth in claim 1 wherein the inputting step includes inputting at least one of the aircraft descent parameters as an aircraft airspeed selected for said descent.

3. The method as set forth in claim 2 wherein the inputting step includes at least one of said aircraft descent parameters as an aircraft airspeed to be flown between position $P_1$ and position $P_0$.

4. The method as set forth in claim 3 additionally comprising the step of visually displaying the aircraft position relative to the descent guideslope in response to the first output and the descent guideslope.

5. The method as set forth in claim 1 wherein the guideslope is formed in a manner that there is a change in a slope of the lower leg relative to a slope of the upper leg due to a difference between the first descent parameters and the second descent parameters.

6. The method as set forth in claim 1 wherein:
   a. the location of position $P_1$ is a function of a projected distance and a projected altitude to be flown by the aircraft when descending to position $P_0$ in accordance with the first descent parameters; and
   b. the location of position $P_2$ is a function of a projected distance and a projected altitude to be flown by the aircraft when descending from position $P_2$ to position $P_1$ in accordance with the second descent parameters.

7. The method as set forth in claim 1 wherein:
   a. at least one of the descent legs is formed by a plurality of segments having end points whose locations are functions of the first and second aircraft descent parameters;
   b. one of the segments includes a calculated vertical component which is a function of a descent occurring during a change in projected aircraft airspeed from a higher airspeed to a lower airspeed; and
   c. another one of the segments includes a calculated vertical component which is a function of a descent occurring during a constant projected aircraft airspeed.

8. The method as set forth in claim 1 wherein:
   a. at least one of the legs is formed by a plurality of descent segments, having upper end points and lower end points whose locations are functions of the first and second aircraft descent parameters; and
   b. a vertical altitude component and horizontal distance component of at least one of the descent segments is determined by first comparing a projected aircraft airspeed at the upper and lower end points, and when the projected airspeeds at the upper and lower end points are not equivalent, generating the horizontal component and vertical component as functions of an aircraft altitude change and a distance change during deceleration from the projected airspeed at the upper end point to the projected airspeed at the lower end point.

9. The method as set forth in claim 1 wherein:
   a. the guideslope is formed by a plurality of descent segments having end points whose locations are a function of the first and second aircraft descent parameters; and
   b. in at least one of the descent segments the projected airspeed of the aircraft decreases from a higher airspeed to a lower airspeed so that (i) an altitude component of the segment having an upper end point $E_1$, relative to the lower descent position $P_0$ is calculated by determining a time to decelerate from the higher airspeed to the lower airspeed to generate a deceleration time, and then by multiplying the deceleration time by a descent rate of the aircraft, and (ii) a horizontal distance component of the descent segment relative to the lower descent position $P_0$ is calculated by multiplying the deceleration time by a ground speed of the aircraft.

10. The method as set forth in claim 9 wherein in at least one of the descent segments, the airspeed of the aircraft is nondecelerating and (i) a vertical altitude component of said at least one segment is an altitude between end point $E_1$ and position $P_1$, and (ii) a horizontal distance component of said at least one segment is calculated by determining a time for the aircraft to descend the altitude between end point $E_1$ and position $P_1$, and then by multiplying the descent time by the aircraft ground speed.

11. The method as set forth in claim 1 wherein the descent is characterized by an aircraft operating transition from the second descent parameters to the first descent parameters.

12. The method as set forth in claim 1 wherein the lower descent position $P_0$ is located relative to a fixed geographical location.

13. The method as set forth in claim 1 wherein the first descent parameters include an aircraft first operating airspeed, and the second descent parameters include an aircraft second operating airspeed which is different from the aircraft first operating airspeed.

14. The method as set forth in claim 6 wherein:
   a. the distance and altitude of position $P_1$ from position $P_0$ is equal to the projected distance and altitude to be flown to position $P_0$ in accordance with the first descent parameters; and
   b. the distance and altitude of position $P_2$ from position $P_1$ is equal to the projected distance and altitude to be flown to position $P_1$ in accordance with the second descent parameters.

15. A method of generating an informational slope for guiding an aircraft descent, the method comprising the steps of:
   a. providing information representing a lower descent position $P_0$ as well as first and second aircraft descent parameters;
   b. calculating a first distance and a first altitude of a position $P_1$ from position $P_0$ as a function of a projected distance and altitude to be flown by the aircraft when descending to position $P_0$ in accordance with the first descent parameters;
   c. calculating a second distance and a second altitude of a position $P_2$ from position $P_1$ as a function of a projected distance and altitude to be flown by the aircraft when descending to position $P_1$ in accordance with the second operating parameters;
   d. forming the informational slope from positions $P_0$, $P_1$, and $P_2$; and
   e. guiding the aircraft in response to the informational slope.

16. The method as set forth in claim 15 wherein at least one of the first and second aircraft descent parameters is an aircraft airspeed selected for the descent.

17. The method as set forth in claim 16 wherein the descent is characterized by an aircraft operating transition from the second descent parameters to the first descent parameters.

18. The method as set forth in claim 17 wherein the first and second aiarcraft descent parameters include an aircraft airspeed to be flown between position position $P_1$ and position $P_0$.

19. The method as set forth in claim 15 wherein the first descent parameters include an aircraft first operating airspeed, and the second descent parameters include an aircraft second operating airspeed which is different from the aircraft first operating airspeed.

20. A method of generating an informational slope for guiding an aircraft descent, the method comprising the steps of:
   a. providing information representing a lower descent position $P_0$ as well as first and second aircraft descent parameters;
   b. generating upper and lower descent legs which form the informational slope, in a manner that (i) the lower descent leg includes the lower descent position $P_0$ and an upper descent position $P_1$, and (ii) the upper descent leg includes the upper descent position $P_1$ and a further upper descent position $P_2$, and so that a location of the upper descent position $P_1$ is calculated relative to the lower descent position $P_0$ as a function of the first descent parameters, and then a location of the position $P_2$ is calculated relative to the upper descent position $P_1$ as a function of the second descent parameters; and
   c. guiding the aircraft in response to the informational slope.

21. The method as set forth in claim 20 additionally comprising the step of providing a visual display of the informational slope.

22. The method as set forth in claim 20 additionally comprising the step of providing a visual display of the informational slope in a manner that the visual display includes an aircraft symbol and an arc having a center which corresponds to the position $P_0$ so that a distance between the aircraft symbol and the arc is representative of a distance between the aircraft and the informational slope, and the location of the aircraft symbol relative to the arc is indicative of the location of the aircraft relative to the informational slope.

23. The method as set forth in claim 20 additionally comprising the step of providing a visual display that includes an alphanumeric display of the informational slope.

* * * * *